United States Patent [19]

Lezberg

[11] 3,748,934
[45] July 31, 1973

[54] CONTROL FOR A SLITTER

[76] Inventor: Melvin G. Lezberg, 15 Crane Ave., Peabody, Mass. 01960

[22] Filed: Nov. 8, 1971

[21] Appl. No.: 196,427

[52] U.S. Cl. .................................. 82/48, 82/70.1
[51] Int. Cl. .......................... B23b 7/00, B23b 3/04
[58] Field of Search ............... 82/46, 48, 101, 70.1, 82/2.5

[56] References Cited
UNITED STATES PATENTS
3,185,005  5/1965  Judelson ............................... 82/48
3,083,601  4/1963  Leiss et al. ............................ 82/48
3,691,879  9/1972  Blake .................................... 82/2.5

Primary Examiner—Harrison L. Hinson
Attorney—Abraham Ogman

[57] ABSTRACT

The invention relates to a control means for a slitter which cuts an elongated member into slices of predetermined lengths. The control means comprises a stepping motor and a control actuator. The stepping motor is responsive to applied pulses of electrical power and functions to rotate its output shaft a discrete and precise amount for each pulse received. The control actuator couples, a preselected number of pulses to the stepping motor. The output shaft is coupled to a cutting means and controls the movement and positioning of the cutting means. The parameters of these components are correlated so that the number of pulses equals the movement of the cutting means and the length sliced from the elongated member.

5 Claims, 2 Drawing Figures

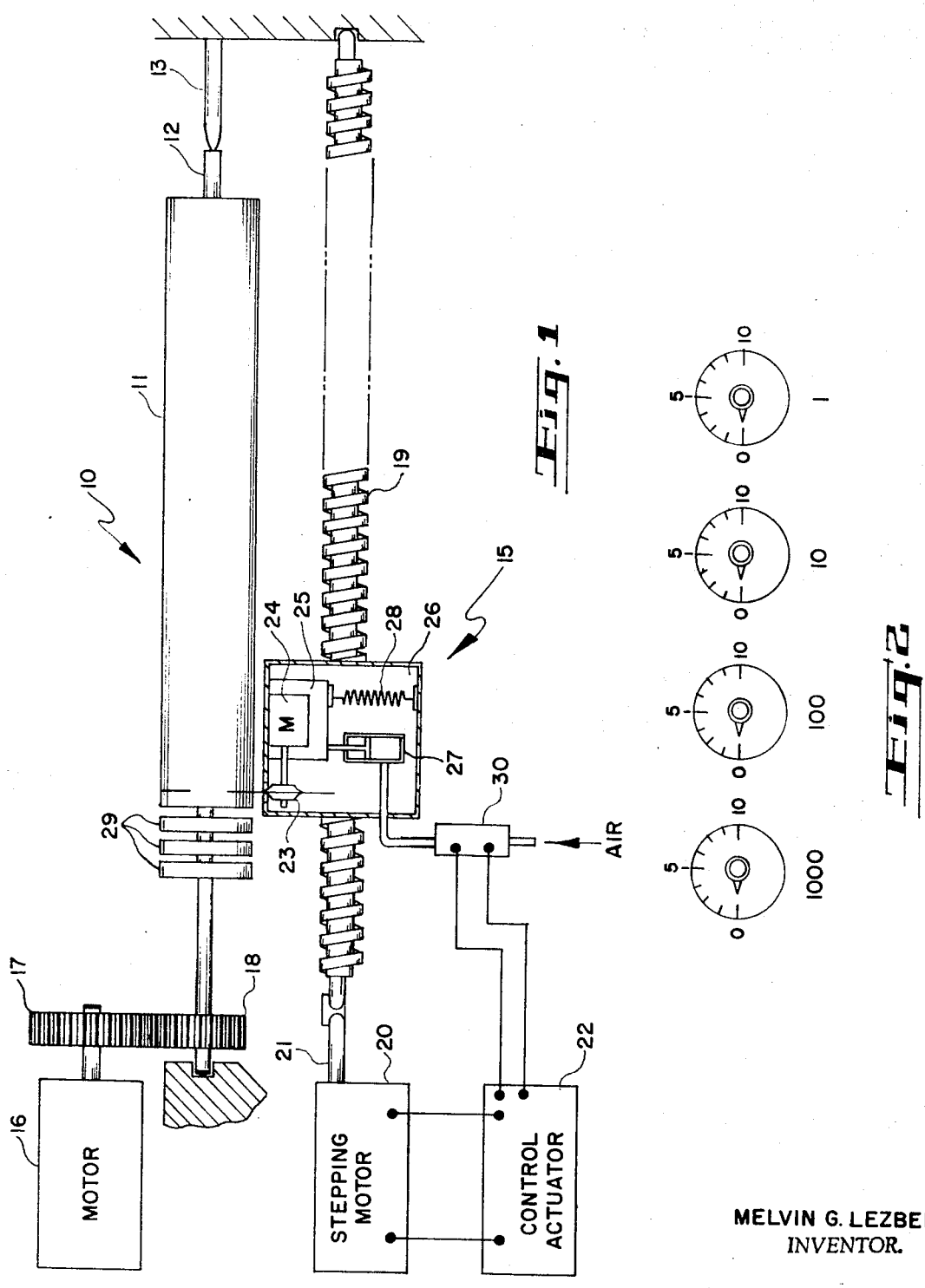

CONTROL FOR A SLITTER

A slitter is a machine that cuts an elongated member, such as a tube, a rod of any cross sectional configuration, or a roll, into shorter lengths or slices. The invention is also useful where it is desired to cut grooves along the length of an elongated member or to score the surface of the elongated member, at a predetermined spacing. However for purposes of illustration the invention will be described in connection with the function of slicing washers from a tube.

Generally, in the past, the slicing operation was performed by mounting a tube on a mandrel and rotating the mandrel and the tube about the axis of the tube. A cutting means is mounted adjacent to the tube and adapted to move into and out of contact with the tube. While the cutting means is in contact with the tube, it scores, cuts grooves, or slices through the tube as the case may be.

After the cutting operation is completed the cutting means is moved a predetermined distance along the tube where the cutting operation is repeated. The distance the cutting means moves determines the length sliced from the tube.

In the past the industry relied on electromechanical means such as mechanical stops and switches to control the movement of the cutting means. These concepts are complicated, and tend to require frequent readjustment to maintain accurate cutting dimensions. The act of changing a cutting length is time consuming.

It is an object of the invention to provide a control means for a slitter which avoids the limitations and disadvantages of prior art devices.

It is another object of the invention to provide a control means for a slitter that operates with unerring accuracy.

It is yet another object of the invention to provide a control means for a slitter which includes the capability of adjusting the length of cut by simple dial setting designating the length of cut desired.

It is still another object of the invention to provide a stepping motor control for a slitter; and It is another object of the invention to provide a control means for a slitter which may be adapted to be programmed to produce cuts of varying lengths.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

FIG. 1 is a schematic representation of a control means for a slitter embodying the principles of the present invention; and FIG. 2 is a stepping motor control actuator control dial designed for a direct correlation between the dial reading and the cutting length.

Referring to FIG. 1 there is depicted, schematically, a slitter 10. The slitter 10 comprises a tube 11 mounted on a mandrel 12. The mandrel 12 is rotated about its axis by a motor coupled to the mandrel 12, as through gears 17 and 18, for example. The opposite end of the mandrel 12 is supported in a bearing 13 such as the fixed bearing 13 illustrated or a live center, for example.

Clearly where is is desired to cut slices from a solid rod the rod would be cantilevered so that slices of desired lengths may be cut from one end.

The slitter 10 also includes a cutting means 15 mounted on a lead screw 19. The cutting means 15 has a knife, in this instance a rotary knife 23 rotated by a motor 24. A stationary knife may also be used.

The knife 23 and the motor 24 are secured on a plate 25 which in turn is connected to a platform 26 through a cross slide (not shown) so that the knife 23 may be moved into and out of contact with the tube 11.

The platform 26 is mechanically connected to the lead screw 19 so that it moves laterally when the lead screw is rotated.

A stepping motor 20 having its output shaft 21 keyed or otherwise connected directly to the lead screw so that there is no relative movement between the output shaft 21 and the lead screw 19 is also provided.

The stepping motor 20 is electrically coupled to an electronic control actuator 22. The control actuator 22 generates pulses which are coupled to the stepping motor 20 to actuate the stepping motor 20. The stepping motor 20 responds to the applied pulses to rotate the output shaft 21 and therefore the lead screw 19 a discrete and precise amount for each pulse received.

The combination of the control actuator and stepping motor combine to provide an unerring and precise control of the cutting means 15 through the lead screw 19.

Stepping motors and control actuators are available from a number of manufacturers and in a number of designs. The specific type is not critical. For purpose of illustration the Model H S 400 B-1003 Stepping Motor and the Model HP R 400 S-4 High Speed Indexer both made by the Superior Electric Company were selected to perform an unique function.

This particular motor requires 200 pulses to rotate the output shaft one full revolution. A lead screw having a pitch or 0.200 was selected. The control panel of the control actuator is illustrated in FIG. 2.

As a result of these characteristics the desired movement of the cutting means may be selected directly on the front panel of the control actuator. No calibration is needed. For example, if the dials, reading from left to right, read 1.250, 1.250 pulses are generated. As a result the output shaft of the stepping motor rotates 6.25 revolutions and because the pitch of the lead screw is 0.200 inches per revolution, the cutting means moves precisely 1.250 inches.

The knife 23 may be moved into and out of contact with the tube 11 by a number of means. A pneumatic plunger 27 connected to a source of air through a valve 30 is controlled by the control actuator 22. When energized, the plunger 27 moves the plate 25 forward. When the valve 30 is deenergized the plate 25 is returned by the spring 28. In the FIG. 1 illustration a washer 29 is produced with each complete reciprocation of the knife 23.

The electronic control actuator 22 may be adapted for tape control operation. Superior Electric sells such a unit. It follows that the movement of the cutting means may be varied by the tape from cut to cut to produce washers of different lengths, possibly in groups that may be packaged for a particular use.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In a slitter for cutting an elongated member into shorter length having an elongated member mounted to move relative to a cutting means, said cutting means being movable along the length of said elongated member, said improvement being a control means for cutting said elongated member comprising:

a stepping motor which rotates a discrete amount in response to a preselected excitation, a control actuator coupled to said stepping motor for coupling a predetermined excitation to the stepping motor;

means coupled to said stepping motor for moving said cutting means linearly along the length of said elongated member in precise proportion to the excitation of the stepping motor.

2. A control means as defined in claim 1 where said stepping motor is coupled to a lead screw which moves said cutting means 3. A control means as defined in claim 2 where the operating parameters of said control actuator, said stepping motor and said lead screw are correlated so that settings on said control actuator designate the amount of movement of said cutting means.

4. A control means as defined in claim 1 where said elongated member is a tube mounted on a rotating mandrel and said cutting means slices washers from said tube.

5. A control means as defined in claim 1 where said control actuator is programable to produce uniform or non uniform lengths.

* * * * *